Feb. 25, 1958 M. VLTAVSKY 2,824,949
HYDRAULIC CONTROL DEVICE FOR RESISTANCE
SEAM-WELDING MACHINES
Filed March 30, 1956
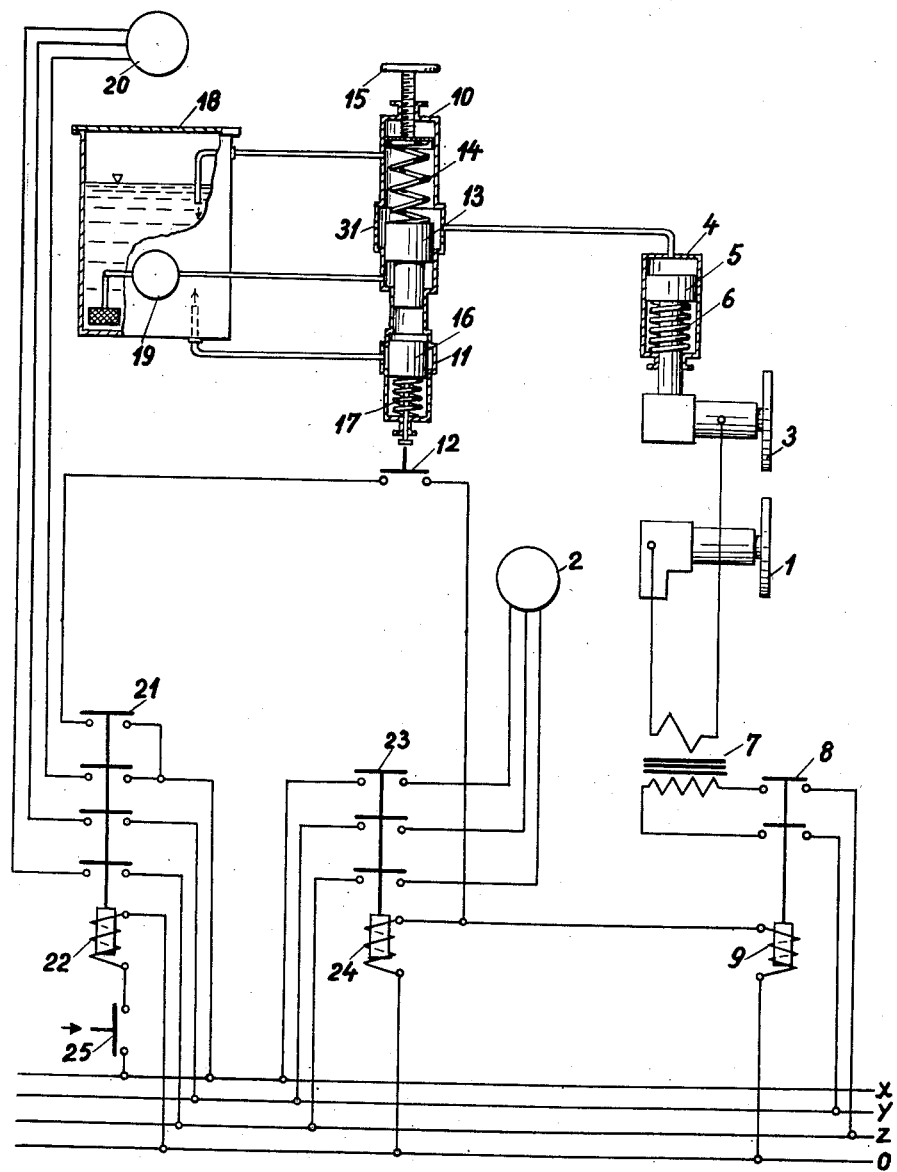
INVENTOR.
Milan Vltavský
BY

United States Patent Office 2,824,949
Patented Feb. 25, 1958

2,824,949

HYDRAULIC CONTROL DEVICE FOR RESISTANCE SEAM-WELDING MACHINES

Milan Vltavsky, Bratislava, Czechoslovakia

Application March 30, 1956, Serial No. 575,097

Claims priority, application Czechoslovakia April 2, 1955

4 Claims. (Cl. 219—81)

Welding with resistance seam-welding machines requires pressing together of the welding rollers with the object to be welded held therebetween prior to switching-on of the welding current which passes between the welding rollers as the latter simultaneously begin their turning movement.

In the hitherto known designs of resistance seam-welding machines the necessary pressure between the welding rollers is developed by a pneumatic cylinder controlled by means of electrically operated valves, the pressure being controlled through a particular check valve. The pressure space of the pneumatic cylinder has a pneumatic pressure contact connected therewith for putting into operation the electric motor driving the welding rollers and simultaneously switching on the welding current.

A drawback of this intricate device consists in that for any change of the pressure brought about by adjusting the check valve it is necessary to re-set the aforesaid pressure contact for the new pressure. A neglect of such re-adjustment leads to the welding current being introduced before the full holding down force is brought about between the rollers. This results in arcing leading to the consumption of the roller surface and even to burning of the object being welded. In other respects, too, pneumatic pressure contacts are a cause of frequent breakdowns in view of their unreliability in operation. Moreover, machines with such devices are dependent on a separate pressure source which in itself is an essential disadvantage.

The present invention aims at eliminating all the aforesaid disadvantages of the hitherto known devices for the drive of resistance seam-welding machines.

According to the present invention, the hydraulically controlled drive of resistance seam-welding machines is essentially improved by mounting between the pressure source which is, e. g. a pump, and the cylinder containing the piston for bringing about the mutual approach and pressing together of the welding rollers, a hydraulic control device such as e. g. a slide valve or valve gear. This hydraulic control device is arranged as a slide valve chamber, for example, by widening the guideway for the piston of the control device so as to form in addition to the guideway for the piston a slide valve chamber. The successive operations, i. e. the control of the piston movement, resulting in pressing together of the welding rollers with the object to be welded held therebetween, the adjustment of the pressing force acting upon the object to be welded, switching on the motor for turning the welding rollers and closing the welding current circuit are governed by this single hydraulic control device. The hydraulic control device controls the sequence of these operations automatically in such a way that the rotation of the welding rollers and the switching on of the welding current passing through the welding rollers can take place only after the object to be welded is held by the rollers with a pressing force which is sufficient for the welding operation e. g. in view of the character of the materials to be welded. This control of the operating sequence is made possible by the head of the differential piston of the control device forming a distributor organ for the pressure liquid for the pressing down piston acting upon the welding rollers, the recessed portion of said piston forming a distribution organ for pressure fluid to act against a piston actuating the switch of the electric circuit controlling the switching on of the electric motor for the drive of the welding rollers and the closing of the welding current circuit. The recessed portion of said differential piston of the hydraulic control organ is of such a length as to open the passage for the pressure liquid to act against the piston controlling the switch or starting the rotation of the rollers and the welding current only after the differential piston of the control device has been shifted by the adjusted welding pressure into its upper position.

The single figure of the accompanying drawing illustrates, by way of example, a resistance seam-welding machine provided with an individual hydraulic pressure source and control device.

The welding machine is provided with a lower welding roller 1 which is driven by an electric motor 2 through suitable gearing (not shown). The electric motor 2 is also able to drive an upper welding roller 3 through a suitable transmission (not shown). The welding roller 3 is pressed toward the lower roller 1 by a hydraulic piston 5 moving inside the cylinder 4 and urged into its upper position by a spring 6. Both welding rollers are connected to the secondary side of the welding transformer 7 the primary winding of said transformer being connected to feed lines y and z by way of contacts 8. The contacts 8 are controlled by the coil of the electromagnet 9. The pressure acting upon the piston 5 and the movement of this piston are controlled by a joint control slide valve 10. The control slide valve 10 is linked up with a device 11 controlling a switch 12. The control slide valve 10 has a differential piston 13 acted upon by a spring 14 pressing downwardly against its head. The force of this spring can be adjusted by a set screw 15. The recessed part of the piston 13 is engaged in its pressureless position shown in the drawing in the inlet to the device 11 closing this organ. The guideway of the piston head 13 opens into an enlarged slide valve chamber 31 communicating hydraulically with the cylinder 4.

The device 11 consists of a piston 16 acted upon by a spring 17.

Inside a container 18 a pump 19 is provided which is driven by an electric motor 20. This electric motor is governed by a contactor 21 controlled by an electromagnet having an energizing coil 22.

The switch 12 is provided to control the energization of the electromagnet 9 and of an electromagnet 24. The electromagnet 24 controls a contactor 23 for the electric motor 2 whilst the electromagnet 9 controls the contacts 8 in the primary circuit of the transformer 7.

The device above described functions as follows:

At rest, the electromagnets 9, 22 and 24 are deenergized, and the electric motors 2 and 20 are out of action. The piston 13 of the control slide valve 10 is pushed by the spring 14 into the lower position shown in the drawing. The spring 6 pushes the piston 5 into its upper position, the pressure liquid being able to pass out of the cylinder 4 through the control slide valve 10 and into the container 18. The head of the piston 13 interrupts communication between the cylinder 4 and the pump 19. The welding rollers 1 and 3 are spaced from each other.

The object to be welded is now introduced between the rollers 1 and 3. By closing a switch 25 interposed in an energizing circuit of electromagnet 22, the latter is energized to close a contactor 21 and the electric motor 20 is operated. The pump 19 starts to force the pressure liquid under the annular face of the piston head 13 thereby pushing the piston up to a position where the slide valve chamber 31 is communicated with a pump 19 and the pressure liquid is able to pass into the cylinder 4. However, the reduced diameter portion of piston 13 is sufficiently long to continue to block the passage into the device 11 after the admission of pressure fluid into the cylinder 4. The piston 5 is pushed down by the pressure liquid whereby the upper welding roller 3 is moved closer to the roller 1. As soon as the welding rollers bear against the object under treatment, further downward movement of piston 5 is prevented and the pressure of the pressure liquid begins to rise, until at a certain value adjusted by means of the set screw 15 the piston 13 of the control slide valve 10 is pushed into its extreme upper position, whereupon, the lower recessed part of the piston 13 opens the passage for the pressure liquid into the device 11. Thereupon the pressure liquid pushes the piston 16 downward thus opening the return passage to the container 18. By the downward movement of the piston 16 the contact 12 is closed so that the electromagnet 24 of the contactor 23 and the electromagnet 9 of the contactor 8 are simulataneously energized for closing the contactors 23 and 8. The electric motor 2 is set into operation and at the same time the electric current is introduced through the contactor 8 into the welding transformer 7. Thus it is ensured that the welding current is switched on only after the welding rollers have been pressed against the object under treatment with full force. This condition must be fulfilled to prevent burning at the beginning of the welding operation.

The welding operation is halted by opening the switch 25, which deenergizes electromagnet 23 and thereby opens the contactor 21 so that the circuit of the electromagnet 9 is broken at its upper contact thus cutting off the welding current before the decrease of the welding pressure.

The device described above prevents the occurrence of welding before the objects to be welded are pressed between the welding rollers with full force and ensures that the welding current will be interrupted when the welding operation is completed before the pressure decreases in the cylinder 4 and causes the welding rollers to move apart from each other. Thus any burning of the welding rollers or of the surface of the welded object by the welding current is avoided both before and after the object under treatment is pressed between the welding rollers.

The device according to the present invention is of much simpler design than the hitherto used pneumatic device and more reliable in its operation for the reason that any intervention of the attendant with the sequence of operations in the welding process is precluded.

I claim:

1. In a resistance seam-welding machine having rotatable welding rollers, pressure fluid operated motor means for moving the welding rollers towards each other to press an object to be welded therebetween, a source of fluid under pressure for operating said pressure fluid operated means, electric motor means for rotating said rollers, a source of welding current for said rollers, and normally open switch means for controlling the operation of the electric motor means and the supplying of welding current from the source of the latter to the welding rollers; an hydraulic control device comprising a valve housing, a valve member slidable in said housing, a pressure fluid supply line leading from the source of fluid under pressure to said housing, a conduit extending from said housing to the pressure fluid operated motor means for carrying pressure fluid to and from the latter, a first return line extending from said housing back to the source of fluid under pressure, a chamber integral with said housing and having a piston movable therein for closing the normally open suitable means in response to the admission of fluid under pressure from said housing into said chamber, a second return line extending from said chamber back to the source of fluid under pressure, said valve member being movable by fluid under pressure admitted to said housing through said supply line from one extreme position, wherein said valve member obstructs communications between said housing and chamber and between said supply line and said conduit while permitting communication between said conduit and said first return line through said housing, to an intermediate position wherein said valve member continues to obstruct communication between said housing and chamber and interrupts communication between said conduit and said first return line, while establishing communication through said housing between said conduit and said supply line so that fluid under pressure is then supplied to the pressure fluid operated motor means for moving the welding rollers toward each other, and to an opposite extreme position, wherein said valve member continues to obstruct communication between said conduit and first return line, while permitting communication between said housing and chamber for effecting closing of the switch means and continuing to establish communication between said supply line and conduit, and adjustable means yieldably urging said valve member to said one extreme position thereof and thereby determining the fluid pressures necessary for moving said valve member to said intermediate position, respectively.

2. In a resistance seam-welding machine; an hydraulic control device as in claim 1, wherein said piston in said chamber normally obstructs said second return line and is moved by the admission of pressure fluid from said housing into said chamber in a direction to uncover said second return line so that said piston also acts as a pressure relief valve.

3. In a resistance seam-welding machine; an hydraulic control device as in claim 1, wherein said housing has a relatively large diameter portion, with first and second smaller diameter portions extending from the opposite ends of the latter and with a further reduced diameter portion extending from one of said smaller diameter portions and opening directly into said chamber, said first return line opening into the other of said smaller diameter portions, said supply line opening into said one smaller diameter portion and said conduit opening into said larger diameter portion; and wherein said valve member is in the form of a differential piston having relatively large and small diameter portions slidable in said smaller diameter portions and in said further reduced diameter portion, respectively, of said housing, said large diameter portion of the differential piston having an axial length substantially equal to the axial length of said large diameter portion of the housing, while said small diameter portion of said differential piston has an axial length substantially greater than the axial length of said one smaller diameter portion of the housing.

4. In a resistance seam-welding machine; an hydraulic control device as in claim 3, wherein said adjustable means yieldably urging said valve member includes a helical spring in said other smaller diameter portion of the housing and abutting, at one end, against said large diameter portion of the differential piston, and an adjustable abutment movable axially within said other smaller diameter portion of the housing and engaging against the other end of said helical spring to vary the initial compression in the latter.

References Cited in the file of this patent

UNITED STATES PATENTS

| | | |
|---|---|---|
| 2,127,265 | Martin | Aug. 16, 1938 |
| 2,396,002 | Frischmann et al. | Mar. 5, 1946 |

FOREIGN PATENTS

| | | |
|---|---|---|
| 557,021 | Great Britain | Nov. 2, 1943 |